(12) United States Patent
Godin

(10) Patent No.: US 6,507,036 B1
(45) Date of Patent: Jan. 14, 2003

(54) THREE DIMENSIONAL OPTICAL SCANNING

(75) Inventor: Guy D. Godin, Ottawa (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/323,019

(22) Filed: Jun. 1, 1999

(51) Int. Cl.[7] .............................. G01N 21/86; G01J 3/28; G01B 11/24
(52) U.S. Cl. ..................... 250/559.22; 356/73; 356/326; 356/601
(58) Field of Search ....................... 250/559.22; 356/73, 356/326, 425, 601

(56) References Cited

U.S. PATENT DOCUMENTS

| | | |
|---|---|---|
| 4,627,734 A | 12/1986 | Rioux |
| 5,177,556 A | 1/1993 | Rioux |
| 5,708,498 A | 1/1998 | Rioux |

OTHER PUBLICATIONS

Patent Abstracts of Japan vol. 016, No. 368 (P–1398), Aug. 7, 1992 & JP 04 115108 A (Matsushita Electric Ind Co Ltd) Apr. 16, 1992. abstract.

Patent Abstracts of Japan vol. 018, No. 384 (P–1772), Jul. 19, 1004 (Jul. 19, 1994) & JP 06 109437 A (Kubota Corp. Apr. 19, 1994 abstract.

Patent Abstracts of Japan vol. 1995, No. 05, Jun. 30, 1995 & JP 07 043115 A (Sony Corp). Feb. 10, 1995 abstract.

*Primary Examiner*—Zandra Smith
(74) *Attorney, Agent, or Firm*—Marks & Clerk

(57) ABSTRACT

A method of determining the color and profile of a target surface involves scanning the target surface with an incident light beam containing a plurality of component wavelengths, forming a beam of light reflected from the target surface and synchronized with the incident beam; and splitting the reflected beam into separate sub-beams of different wavelengths. The sub-beams are directed onto a sensor array to permit their relative positions to be determined as the incident beam moves over the target surface. A portion of the reflected beam is directed onto a color sensitive photodetector to obtain data representative of the approximate color composition of the reflected beam. The color and profile of the target surface is determined from the relative positions of the sub-beams on said sensor array using the data representative of the approximate wavelength composition to resolve ambiguities in the results. The split portion of the reflected beam can also be sampled at a higher rate than the sensor array to obtain information about the appearance of the surface at a higher resolution than possible with the sensor array alone.

23 Claims, 2 Drawing Sheets

THREE DIMENSIONAL OPTICAL SCANNING

SUMMARY OF THE INVENTION

This invention relates to the field of optics, and more particularly to a method of making color and profile measurements on three-dimensional surfaces.

BACKGROUND OF THE INVENTION

The ability to measure the color and three-dimensional shape of objects at a high-resolution allows the input of representations of real objects into computers. These digital models can then be stored, transmitted, analyzed and displayed. For example artifacts from museum collections can be digitized and stored as models, which can be made available for interactive viewing, cataloguing and analysis by curators, art historians or the public. Such applications require high-resolution models constructed from accurate measurement of geometric and color properties of the object's surface.

One technique for carrying out such measurements is employed in the National Research Council of Canada's laser range sensor. This includes a device for scanning a surface with an incident laser beam to form a reflected beam, which is directed onto a photosensitive sensor linear array, typically a CCD (Charge Coupled Device). In the monochromatic version, the relative position of the reflected beam on the sensor array as the incident beam is scanned across the target surface gives profile information by triangulation. The amount of light returned to the sensor array can also be measured and used to estimate the reflectance of the target surface. In the polychromatic version, color information is obtained in addition to profile information by using a polychromatic laser and splitting the reflected light into the three component wavelengths, and imaging them at different locations on the CCD array. The output signal of the CCD array will contain peaks corresponding to the image of the spot for each laser wavelength. The position of the target surface can be obtained by triangulation, assuming that the identity of each peak, that is its original wavelength, is known. The amount of light returned to the sensor for each wavelength can be calculated from the shape of the peak. The intensity of the primary wavelengths on the sensor array permits the color of the surface to be calculated knowing the amount of each wavelength present in the reflected beam. Such a technique is described in, for example, U.S. Pat. No. 5,177,556.

A significant drawback of this method is its inability to identify the original wavelength of a peak on the CCD when only one wavelength is reflected, thus preventing profile estimation at that point. A wrong identification of wavelength leads to a gross error in depth estimation as well as in color measurement.

Another known technique for color measurement uses an auxiliary photodetector cell responsive to each of the three wavelengths to analyze a portion of the light returned to the sensor in order to extract the color information. This method gives a non-ambiguous measurement, but loses one of the advantages of the first technique, which is that the estimation of the returned intensity can be precisely limited to the identified peak corresponding to the portion of the surface profile illuminated by the laser spot. The photodetectors are sensitive to the entire instantaneous field of view and can be easily contaminated by ambient light or multiple reflections. Ambient light outside the wavelengths of the laser can be eliminated with the aid of filters. However, residual illumination remains (depending on the spectral content of the ambient light) or indirect reflections from the laser source coming from elsewhere than the surface illuminated by the light spot may also influence the measurements. Such a method is described in U.S. Pat. No. 5,708,498.

In the first-mentioned technique, the sensor provides depth and color information at a similar rate, since the depth is determined from the position of one or a combination of the peaks imaged on the CCD, and the color is derived from the amplitude of each peak's distribution. At each measurement cycle, the signal produced by the CCD is analyzed to extract position and amplitude of the peaks.

A still further drawback is that the acquisition of three-dimensional data in regions where the reflectivity suddenly changes results in errors in the profile measurements.

A well-known difficulty common to all triangulation-based laser sensing systems is that sudden changes in reflectance of the measured surface are likely to cause errors in profile measurement. This occurs because the measurement is derived from imaging a finite area illuminated by the laser. If the underlying surface exhibits a change in reflectance, then the image of the spot will be skewed as compared to a uniform surface. The position measurement on the CCD may be influenced and lead to a bias in estimating the shape of the profile.

An object of the present invention is to alleviate the aforementioned disadvantages of the prior art.

SUMMARY OF THE INVENTION

According to a first aspect of the present invention there is provided a method of determining the color and profile of a target surface, comprising the steps of scanning the target surface with an incident light beam containing a plurality of component wavelengths; forming a beam of light reflected from said target surface; forming the reflected beam into one or more separate sub-beams corresponding to the component wavelength or wavelengths of the reflected beam; directing said one or more sub-beams onto a sensor array; detecting the positions of said one or more sub-beams on said sensor array as said incident beam moves over the target surface; directing at least a portion of the reflected beam onto wavelength sensitive photodetector means to obtain data representative of the approximate wavelength composition of said reflected beam; and determining the color and profile of the target surface from the relative positions and shapes of peaks produced by said one or more sub-beams on said sensor array using said data representative of the approximate wavelength composition to resolve potential ambiguities in the results obtained from said sensor array.

The proposed color measurement apparatus is a hybrid system that uses both color-separated peak measurement on the CCD and auxiliary measurement with a photodetector. Unlike the prior art, the advantages of color measurement obtainable with the sensor array are preserved, with the auxiliary photodetector serving mainly to resolve ambiguities in the precise measurements obtainable by the CCD array. The photodetector should preferably be sampled at a rate higher than the CCD for reasons that will be explained in more detail below.

The most significant advantage of such a configuration is that it permits the surface color to be determined when, for example, only a single reflected wavelength is present. The photodetector cell, though affected by light sources other than the region illuminated by the laser spot, will give a measurement dominated by one or more wavelengths present on the surface that is directly illuminated, and will therefore permit the identification of the wavelength beam illuminating the CCD when only one beam is present. In this case, color measurement is carried out by the CCD in exactly the same manner as in the prior art, and the auxiliary measurements mainly serve to resolve ambiguities.

In the method according to the invention, the photodetector should advantageously, but not necessarily, be sampled at a frequency $f_p$, which is an integral multiple of the frequency $f_c$, of reading an entire intensity profile from the sensor array.

Another aspect of the invention also provides a method of determining the profile of a target surface, comprising the steps of scanning the target surface with an incident light beam; forming a beam of light reflected from said target surface; directing said reflected beam onto a sensor array to create an intensity profile signal; sampling said intensity profile signal at a first sampling rate to create a first set of data points representing the intensity distribution on said array in each sampling period $1/f_c$; directing at least a portion of the reflected beam onto photodetector means to obtain an output signal representative of the intensity of said reflected beam; sampling said output signal at a second sampling rate $f_p$ significantly higher than said first sampling rate $f_c$ to create second data points representative of intensity in each sampling period at said second sampling rate; and deriving from said first set of data points a third set of data representative of the relative position of said reflected beam on said sensor array as said beam scans said surface while using said second data to provide additional information at a higher resolution about the appearance of the surface within each sampling period at said first sampling rate.

Each profile measurement is the time integral of the reflection from the surface, over one cycle of the first sampling rate on the CCD. Oversampling of the returned intensity measured by the photodetector permits the surface texture, i.e. color or intensity, to be determined at a resolution higher than the profile. In principle, the sum, suitably normalized, of the oversampled measurements should correspond to the intensity measured by the CCD in a single cycle. This sum can serve to resolve the ambiguities in the manner indicated above. Moreover, oversampled measurements give a spatial distribution of surface texture resolution better than the profile measurement in the direction of scan.

The oversampling of the intensity measurements can also be used to correct anomalies caused by the discontinuities in the reflectance of the surface. By having a measurement of the time distribution of the reflection during one cycle of surface point measurement, it is possible to detect the presence of such discontinuities in the portion of the illuminated surface during the measurement of a single point from the distribution of measurements in the oversampled measurements. It is thus possible to compensate at least partially for the effect from the estimated measurement.

It should be noted that the last two advantages, which are related to the use of oversampling, exist both for monochrome and color measurements, and apply not only to the hybrid system proposed above, but also to systems employing only a photodetector sensitive to the different wavelengths, such as that described in U.S. Pat. No. 5,708, 498.

The main problem addressed by the invention is the wavelength ambiguity when only a single peak is present. The method resolves this problem with the addition of a photodetector cell. This addresses a very important problem that limits the use of color-separated peak technology. The combination of this technique with the oversampling principle also opens the door to the possibility of measuring color at a resolution greater than that of the profile, which could be interesting in modeling and creating shape and color models for display purposes, where the texture density required is generally greater than the needs for geometric measurement. Moreover, it is possible from the oversampled intensities to correct known errors arising from intensity discontinuities.

The invention further provides an apparatus for determining the color and profile of a target surface, comprising a light source for scanning the target surface with an incident light beam containing a plurality of component wavelengths; a lens for forming a beam of light reflected from said target surface; a beam splitter for splitting the reflected beam into one or more sub-beams corresponding to the component wavelengths of the reflected beam; a sensor array for sensing said one or more sub-beams and permitting the positions of said one or more sub-beams to be detected as said incident beam moves over the target surface; and a wavelength sensitive photodetector receiving at least a portion of the reflected beam to obtain data representative of the approximate wavelength composition of said reflected beam; whereby the color and profile of the target surface can be determined from the positions and shapes of peaks produced by said one or more sub-beams on said sensor array using said data representative of the approximate wavelength composition to resolve potential ambiguities in the results obtained from said sensor array.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
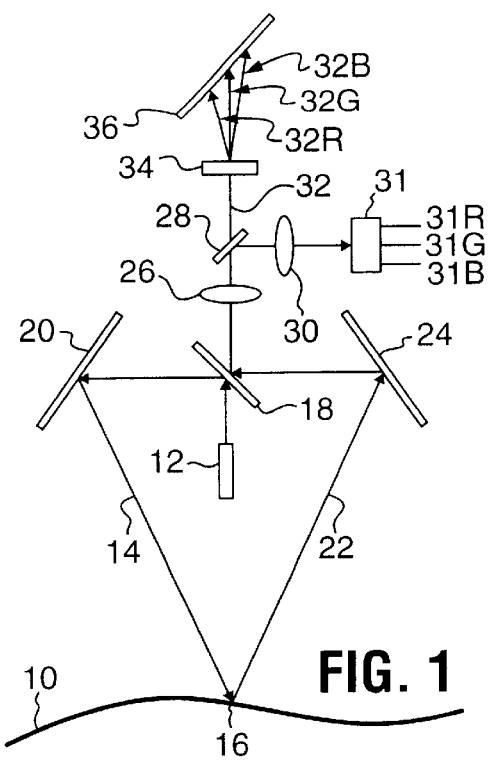
FIG. 1 is a diagrammatic representation of a color measurement system in accordance with the first embodiment of the invention.

Referring now to FIG. 1, a surface for which the color and profile is to be measured is identified at 10. This will typically be the contoured surface of a three-dimensional object for which profile and color data is to be gathered. A polychromatic laser light source 12 (for example, consisting of red, green and blue light) directs a polychromatic light beam 14 onto a spot 16 on the surface 10 via angled mirrors 18, 20. Mirror 18 oscillates to cause the beam 14 to scan the surface 10. Mirror 20 is fixed.

The reflected beam 22 returns via fixed angled mirror 24, the backside of oscillating mirror 18 and lens 26. After passing through the lens 26, the reflected beam strikes a partially reflecting mirror 28, which directs a first portion of the reflected beam 30 to photosensitive detector 31, which has the ability to measure the amount of reflected light of each wavelength present in the incident beam, and a second portion 32 via wavelength separator 34, for example a prism, to slanted CCD array 36.

The common mirror 18 causes the reflected beam 22 to move in synchronism as the incident beam 14 travels across the surface 10. If the position of the illuminated spot 16 on the surface 10 changes relative to the system, this translates into a displacement of the sub-beams on the surface of the CCD array 36. The position of any one of these signals, along with the rotation angle of mirror 18, indicates the position of the point 16 on the surface 10 that is illuminated by the beam using triangulation techniques. The profile information is derived from one or a combination of sub-beams. The wavelength identity of the sub-beam must be known in order to correctly infer the profile information. The known displacement enables the position relative to the apparatus of the illuminated points on the profile to be calculated using triangulation techniques. The three-dimensional measurement system generally functions in the manner described in U.S. Pat. No. 5,708,498, which is incorporated herein by reference.

The intensities of the respective beams, assuming more than one is present, enable color information about the surface to be derived with a high degree of precision. In the prior art, if only one beam is present, it is not possible to extract color and position information because there is no way for the system to identify which beam is present. If two beams are present, it may or may not be possible depending on the circumstances. However, the photodetector 31 can provide a measure of the intensity of returned light in the three wavelengths 31R, 31G, 31B which can be used to identify the original wavelength of a peak when less than three are present by comparing the measurements obtained by the photodetector 31 and the peaks on the CCD 36.

Figure 2:
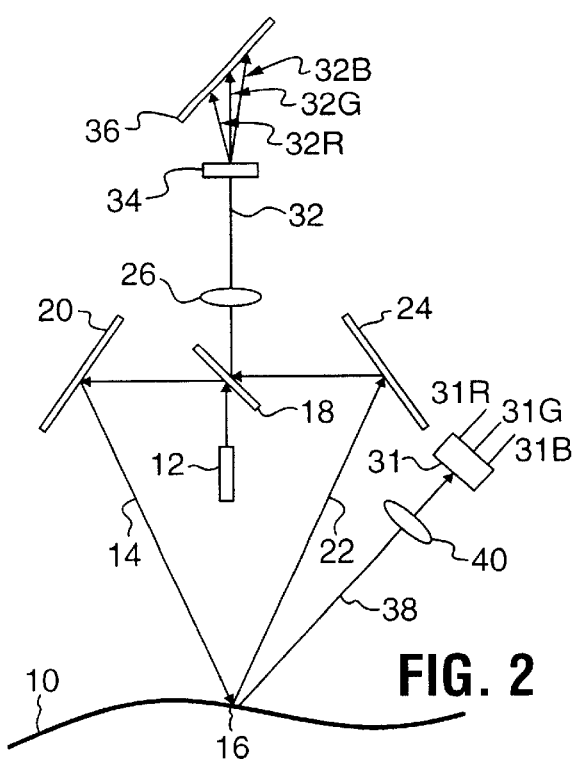
FIG. 2 is a diagrammatic representation of a color measurement system in accordance with a second embodiment of the invention.

FIG. 2 shows an arrangement similar to FIG. 1 except that the photodetector 31 receives a reflected beam directly from the surface 10 through lens 40. Photodetector 31 no longer shares the same optics as the CCD 36.

Figure 3:
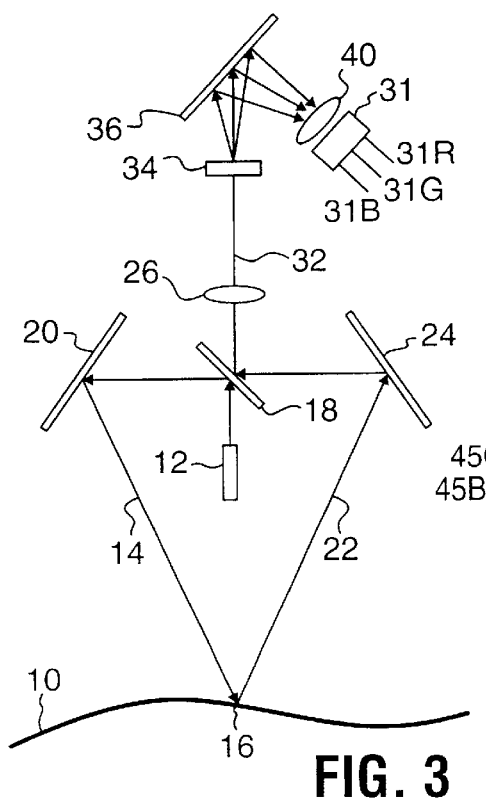
FIG. 3 is a diagrammatic representation of a color measurement system in accordance with a third embodiment of the invention.

In FIG. 3, the photodetector 31 receives the light reflected off the surface of the CCD array 36.

Figure 4:
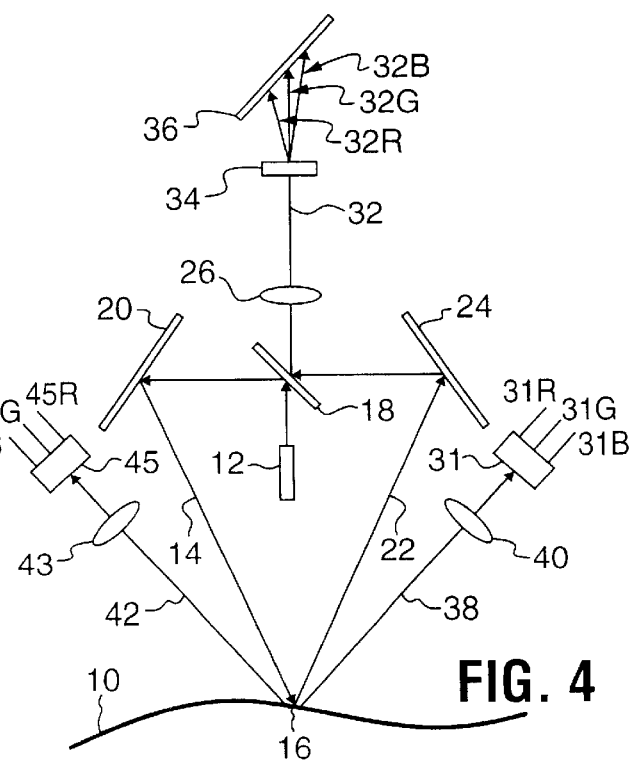
FIG. 4 is a diagrammatic representation of a color measurement system in accordance with a fourth embodiment of the invention.

FIG. 4 shows an arrangement similar to FIG. 3, but where more than one photodetectors are used to measure light reflected in different directions.

The photodetector 31 produce output signals representing the intensities of the different component wavelengths of the reflected beam. However, because the photodetector 31 integrates light over a wider field of view than the CCD array, it is more affected by ambient light and also reflections off other parts of the target surface, especially if it has a highly profiled surface. Thus, in accordance with an aspect of the invention, the outputs of the photodetector 31 are not primarily used to derive color information directly, but mainly to resolve potential ambiguities in the more accurate output of the CCD array 36. Thus, if for example only one beam produced by a surface reflecting only the blue wavelength is present at the CCD array 36, the photodetector 31 will give a signal with a strong blue component, which may nonetheless be contaminated with ambient light. The reflected beam will be correctly identified as pure blue in this example.

Figure 5:
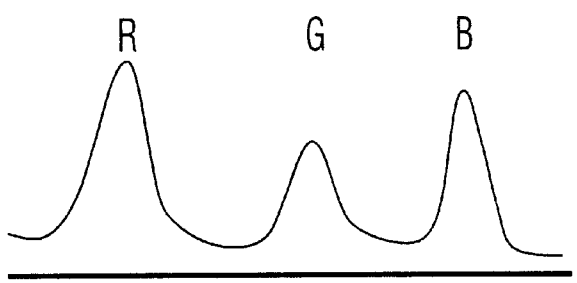
FIG. 5 shows the intensity profile of a CCD array output in a sampling period.

The outputs of the CCD array 36 and photodetector 31 are in reality processed digitally in a computer. The CCD array is a linear monochrome array. When the reflected beams fall on it, is produces an output signal as shown in FIG. 5, which shows the intensity distribution along the array. The peaks represent the three red, green and blue sub-beams, in the case of a light source containing three distinct wavelengths. The position of any one of the peaks on the array gives the range to the target and their relative intensity give the color of the target surface. The intensity profile is in fact represented by a series of digital data points representing the intensity at each pixel of the CCD.

The entire CCD array is read at a predetermined rate, typically 10 KHz, i.e. 10,000 timeslots of 0.1 msec each during each scan. In each time slot, a computer determines the positions and amplitudes of the peaks and retains data points corresponding thereto.

Figure 6:
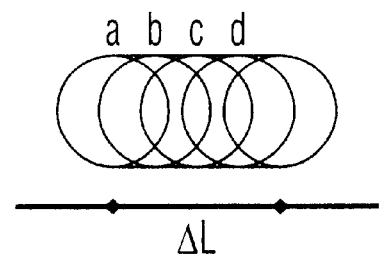
FIG. 6 shows a laser spot scanning a target surface.

In actual practice, as shown in FIG. 6, because of the finite length of a timeslot, the laser spot moves a distance $\Delta L$ over the target. The light falling on the CCD array 36 is an integral of the light reflected in this timeslot. The sampling rate is limited by the sensitivity of the equipment and can be readily selected by one skilled in the art for a particular configuration.

In accordance with another aspect of the invention, the photodetector 31 is sampled at a rate that is higher, preferably an integral multiple of, the sampling rate of the CCD array 36 and in synchronism therewith. The sampling for the photodetector rate is typically 4 to 10 times higher than the rate for the CCD array. The result is that the texture information, color and intensity of the surface, can be measured to a higher resolution, by a factor equal to the multiple of the sampling rate, than the geometric information. FIG. 6 shows why. During each sampling period of the CCD array 36, there is a plurality n of overlapping spot areas 38 whose total envelope corresponds to the CCD measurement. The amount of reflected light is sampled from the photodetector at sample times a, b, c, d, corresponding to the number of samples n (here for example 4) taken during each CCD sampling period. From the combination of a profile on the CCD and the n samples from the photodiodes, the surface color information can be calculated to a degree of resolution higher than that obtainable with the CCD array alone. The increase in resolution only applies to color or intensity information, not geometric information, which still remains limited by the sampling rate of the CCD array. The oversampling by the photodetector can also be used to advantage in a monochrome arrangement, for example to measure surface texture in a single wavelength.

Figure 7:
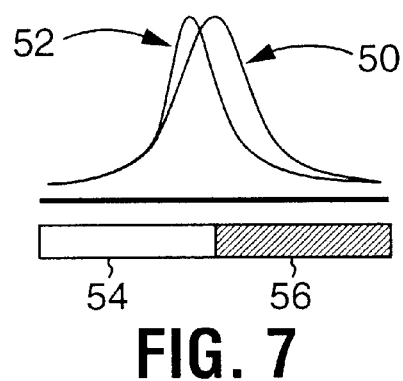
FIG. 7 shows the change in intensity profile caused by surface artifacts.

Sudden changes between light and dark can skew the peak on the CCD array, causing the equipment to detect a shift in the center of the peak on the CCD array. This results in the false detection of a change in the profile of the target surface. FIG. 7 shows why. For an even surface the peak 50 will have an even intensity distribution as shown in FIG. 7. If instead the left half 54 is bright and the right half 56 is dark, the intensity profile 52, which represents the time integral of the intensity over the sampling period, is skewed since more light is reflected from the bright surface. The computer interprets this as a shift in the peak, which in turn is falsely interpreted as a change in range and thus the profile of the surface.

Since the photodetector 31 in effect takes a number of intensity samples during each sampling period of the CCD array, the presence of the sharp change in intensity can be detected, and taken into account to compensate for the change in shape of the peak profile. This can be performed in both the monochromatic and polychromatic versions of the system.

This invention thus provides a method of obtaining texture information at a higher resolution than the geometric information, of compensating for artifacts due to sudden changes in surface intensity, and of resolving color ambiguities without loss of accuracy.

In addition to the configurations described above, a plurality of photodetectors, located at different orientations including outside of the triangulation plane, can be used. Each of them will measure the reflected light in a particular direction. Each photodetector can be oversampled and used in the manner described above. The use of more than one photodetector provides multiple samples of the angular distribution of light reflected by the surface. An example of such a configuration is shown in FIG. 4, where two different photodetectors are used.

Figure 8:
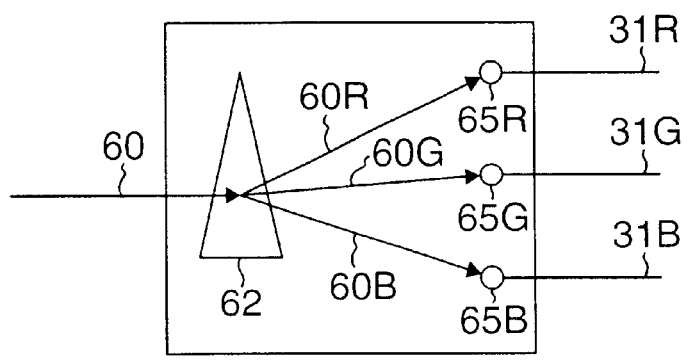
FIG. 8 shows the details of a photodetector with the ability to distinguish different wavelengths.

FIG. 8 shows one possible embodiment of a photodetector that can be used in the proposed invention. The photodetector provides means to produce signals representative of the amount of light in each of the component wavelength. In this particular configuration an incoming beam 60 is decomposed by a prism into its component wavelength which are directed onto distinct photodetectors that produce signals representative of the amount of light in each corresponding spectral band.

While the invention has been described in relation to auto-synchronized scanning, it will be understood by one skilled in the art that it is equally applicable to ordinary triangulation.

I claim:

1. A method of determining the color and profile of a target surface, comprising the steps of:
    scanning the target surface with an incident light beam containing a plurality of component wavelengths;
    forming a beam of light reflected from said target surface;
    passing said reflected beam through a wavelength separator to form one or more separate sub-beams corresponding to the component wavelength or wavelengths of the reflected beam;
    directing said one or more sub-beams onto a sensor array located downstream of said wavelength separator;
    detecting the positions of said one or more sub-beams on said sensor array as said incident beam moves over the target surface;
    directing at least a portion of the reflected beam onto wavelength sensitive photodetector means separate from said sensor array to obtain data representative of the approximate wavelength composition of said reflected beam;
    determining the color and profile of the target surface from the relative positions and shapes of peaks produced by said one or more sub-beams on said sensor array; and
    using said data representative of the approximate wavelength composition to determine the wavelength identity of said one or more peaks when ambiguities in the wavelength identity of said peaks arise due to the absence of one or more said component wavelengths in the reflected beam.

2. A method as claimed in claim 1, wherein said potion is split off from said reflected beam with the aid of a partly reflecting mirror prior to being formed into one or more sub-beams.

3. A method as claimed in claim 1, wherein said portion is formed by collecting said one or more sub-beams reflected off the surface of said sensor array.

4. A method as claimed in claim 1, wherein said photodetector means comprises a plurality of photodetectors responsive to the respective component wavelengths of said reflected beam, and said portion is split into component wavelengths directed at said respective photodetectors.

5. A method as claimed in claim 1, wherein said reflected beam is autosynchronized with said incident beam.

6. A method as claimed in claim 1, wherein said sensor array is a slanted CCD array.

7. A method of determining the profile of a target surface, comprising the steps of:
    scanning the target surface with an incident light beam;
    forming a beam of light reflected from said target surface;
    directing said reflected beam onto a sensor array to create an intensity profile signal;
    sampling said intensity profile signal at a first sampling rate $f_c$ to create a first set of data points representing the intensity distribution on said array in each sampling period;
    directing at least a portion of the reflected beam onto photodetector means to obtain an output signal representative of the intensity of said reflected beam;
    sampling said output signal at a second sampling rate $f_p$ significantly higher than said first sampling rate $f_c$ to create second data points representative of intensity in each sampling period at said second sampling rate; and
    deriving from said first set of data points a third set of data representative of the relative position of said reflected beam on said sensor array as said beam scans said surface while using said second data to provide additional information at a higher resolution about the appearance of the surface within each sampling period at said first sampling rate.

8. A method as claimed in claim 7, wherein said photodetector means is wavelength sensitive and said additional information is the variation in color of the surface over a region whose size is determined by said first sampling rate $f_c$ at a resolution determined by said second sampling rate $f_p$.

9. A method as claimed in claim 8, wherein said reflected beam is split into component wavelengths prior to striking respective photodetectors constituting said photodetector means.

10. A method as claimed in claim 7, wherein said second sampling rate $f_p$ is an integral multiple of said first sampling rate and synchronous therewith.

11. A method as claimed in claim 10, wherein said second sampling rate is about 4 to 10 times said first sampling rate.

12. A method as claimed in claim 7, wherein a third set of data are derived using said additional information to provide information about the intensity distribution of the reflected beam within a sampling period so as to compensate for discontinuities in the reflectance of the surface.

13. An apparatus for determining the color and profile of a target surface, comprising:
    a light source for scanning the target surface with an incident light beam containing a plurality of component wavelengths;
    a lens for forming a beam of light reflected from said target surface;
    a wavelength separator for splitting the reflected beam into a plurality of sub-beams corresponding to the component wavelengths of the reflected beam;
    a sensor array located downstream of said sensor array for sensing said sub-beams and permitting the positions of said sub-beams to be detected as said incident beam moves over the target surface; and a wavelength sensitive photodetector, separate from said sensor array, receiving at least a portion of the reflected beam to obtain data representative of the approximate wavelength composition of said reflected beam;

whereby the color and profile of the target surface can be determined from the positions and shapes of peaks produced by said sub-beams on said sensor array, and said data representative of the approximate wavelength composition can be used to determine the wavelength identity of said sub-beams when ambiguities arise due to the absence of one or more component wavelengths in the reflected beam.

14. An apparatus as claimed in claim 13, further comprising a partly reflecting mirror for directing a portion of said reflected beam onto said photodetector.

15. An apparatus as claimed in claim 13, wherein said photodetector comprises a plurality of photodetectors responsive to the respective component wavelengths of said reflected beam.

16. An apparatus as claimed in claim 13, further comprising a rotating mirror to autosynchronize said reflected beam with said incident beam.

17. An apparatus as claimed in claim 13, wherein said sensor array is a slanted CCD array.

18. An apparatus for determining the profile of a target surface,:
   a light source for scanning the target surface with an incident light beam;
   a lens for forming a beam of light reflected from said target surface and directing said reflected beam onto a sensor array to create an intensity profile signal;
   means for sampling said intensity profile signal at a first sampling rate $f_c$ to create a set of data points representing the intensity distribution on said array in each sampling period;
   means for directing at least a portion of the reflected beam onto photodetector means to obtain an output signal representative of the intensity of said reflected beam;
   means for sampling said output signal at a second sampling rate $f_p$ significantly higher than said first sampling rate $f_c$ to create second data points representative of intensity in each sampling period at said second sampling rate; and
   means for deriving from said first set of data points a third set of data representative of the relative position of said reflected beam on said sensor array as said beam scans said surface while using said second data to provide additional information at a higher resolution about the appearance of the surface within each sampling period at said first sampling rate.

19. An apparatus as claimed in claim 18, wherein said photodetector means is wavelength sensitive and said additional information is the variation in color of the surface over a region whose size is determined by said first sampling rate $f_c$ at a resolution determined by said second sampling rate $f_p$.

20. An apparatus as claimed in claim 18, wherein said second sampling rate $f_p$ is an integral multiple of said first sampling rate and synchronous therewith.

21. A method of determining the color and profile of a target surface, comprising the steps of:
   scanning the target surface with an incident light beam containing a plurality of component wavelengths;
   forming a beam of light reflected from said target surface;
   forming the reflected beam into one or more separate sub-beams corresponding to the component wavelength or wavelengths of the reflected beam;
   directing said one or more sub-beams onto one or more sensor arrays to form one or more intensity profile signals;
   sampling said one or more intensity profile signals at a first sampling rate $f_c$ to create a first set of data points representing the intensity distribution on said array in each sampling period;
   directing at least a portion of the reflected beam onto wavelength sensitive photodetector means to obtain an output signal representative of the wavelength composition of said reflected beam, and sampling said output signal at a second sampling rate $f_p$ significantly higher than said first sampling rate $f_c$ to create second data points representative of intensity in each sampling period at said second sampling rate;
   determining the color and profile of the target surface from the positions and shapes of peaks produced by said one or more sub-beams on said sensor array using said data representative of the approximate wavelength composition to resolve potential ambiguities in the results obtained from said sensor array; and
   deriving from said first set of data points a third set of data representative of the position of said one or more sub-beams on said sensor array as said beam scans said surface while using said second data to provide additional information at a higher resolution about the appearance of the surface within each sampling period at said first sampling rate.

22. A method as claimed in claim 21, wherein said sensor array is a slanted CCD array.

23. A method as claimed in claim 22, wherein said reflected beam is auto-synchronized with said incident beam.

* * * * *